L. E. Hicks,
Truss Pad.

N° 12,986.    Patented May 29, 1855.

UNITED STATES PATENT OFFICE.

LUCIEN E. HICKS, OF BOSTON, MASSACHUSETTS, ASSIGNOR TO HIMSELF, AND H. L. HALL, OF BEVERLY, MASSACHUSETTS.

PAD FOR HERNIAL TRUSSES.

Specification of Letters Patent No. 12,986, dated May 29, 1855.

*To all whom it may concern:*

Be it known that I, LUCIEN E. HICKS, of Boston, in the county of Suffolk and State of Massachusetts, have invented a new and useful Pad for Trusses, of which the following is a full, clear, and exact description, reference being had to the accompanying drawings, making part of this specification, in which—

Figure 1:
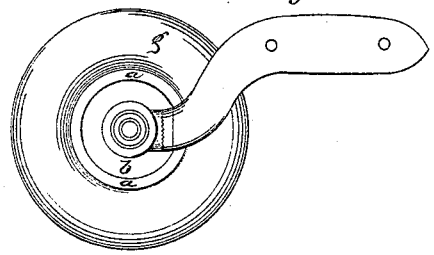
Figure 6:
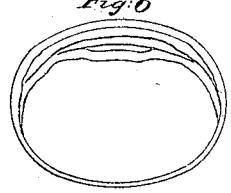
Figure 2:
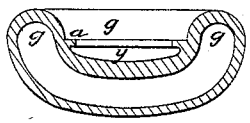
Figure 3:
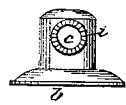
Figure 4:
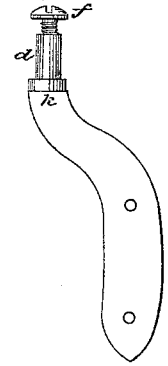
Figure 5:
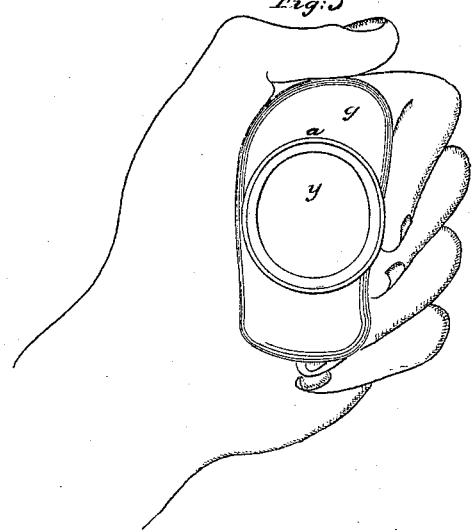

Figure 1 is a plan of the pad with the shank attached. Fig. 2 is a section through the center of the pad; Fig. 3, the button; Fig. 4, the shank; Fig. 5, an illustration of the manner in which the button is inserted in the pad. Fig. 6 will be referred to hereafter.

In truss pads as heretofore constructed the metallic attachment or plate by which means the shank of the pad is secured to the cushion has been placed outside and upon the top of the latter, in this position it was very liable to annoy and incommode the person.

The first part of my invention consists in the use of an india rubber truss pad filled with compressed air and without opening or valve. Those most generally in use are made of various materials and stuffed for the purpose of producing a soft elastic surface, but I have found an india rubber pad filled with compressed air to be far superior to them all, yielding to every motion of the body without the least rigidity, and easily recovering its position when temporarily displaced.

Attempts have been made to make an india rubber pad which was inflated through a valve by the mouth, but such valves are always liable to leak, and the pad even when new requires to be constantly re-inflated. I have never known of one being produced that was filled with compressed air and that had neither valve nor opening for its inflation.

I will describe generally the manner in which my pad is made though this forms no part of my present invention. In another application for Letters Patent I shall describe and claim the peculiarities of its manufacture more particularly.

Figure 7:
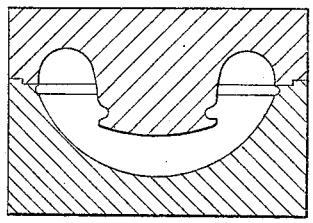

The pad is first made of india rubber of a suitable thickness of the form represented in section in Fig. 6. The side A which is to form the elastic yielding surface is made of a single thickness of india rubber,—the other side which is required to hold the shank and to retain its form and position is made much thicker, the different layers being chamfered off so that the thicker portion may gradually run into the thinner; the parts are then tightly cemented together and the ball is forced into a metallic mold made in two parts and seen in outline in Fig. 7. The pad is thus greatly reduced in size by having the upper part forced in to form the cavity $y$, and the air is thereby compressed. The mold after being clamped to prevent its separating is then heated to a sufficient degree to vulcanize the rubber which is forced by the exhaustion of the air while it is in a semi-liquid state to assume the exact shape of the interior of the mold; the form represented in Figs. 1 and 2 which is thus given to it, is retained after it leaves the mold.

$a$ is a flange which secures the button $b$ to the pad. This flange surrounds and incloses a cavity $y$ in the center of the pad and beneath its upper surface, which is entirely surrounded by the annular air cushion $g$—by which construction and arrangement of parts not only is the person protected from annoyance by an undue or unequal pressure of the pad, but the latter has an easy rolling motion which prevents it from being displaced by the motions of the body.

In Fig. 3 is seen the button and in Fig. 4 the shank detached, the cylindrical part $d$ of which enters a socket $c$, attached to the button and the two are secured together by the screw $f$, the serrated edges $i$ and $k$ coming in contact and locking with each other. When it is desired to re-adjust the position of the pad upon the shank the screw $f$ is loosened and again tightened up after the pad is adjusted in position.

When it is required to attach the shank to the pad the latter is compressed by the hand so as to enlarge the flange $a$ as seen in Fig. 5 when the button may be inserted, the flange immediately closing around it when the pressure is removed.

What I claim as my invention and desire to secure by Letters Patent is—

1. An india rubber pneumatic truss pad without opening or valve and filled with compressed air as set forth.

2. I claim making the top of the pad thicker than the bottom or cushion whereby the former is rendered sufficiently rigid to allow of the attachment of the shank, while the cushion maintains its entire elasticity as set forth.

3. I claim sinking the button beneath the surface of the pad within the cavity $y$, and securing it therein by the flange $a$, by which means the button is surrounded by the annular cushion $z$ and is prevented from coming in contact with the person in the manner substantially as herein set forth.

L. E. HICKS.

Witnesses:
    EDWIN LEE BROWN,
    SAM. CASPER.